(12) United States Patent
Baumhöfer et al.

(10) Patent No.: US 6,439,286 B1
(45) Date of Patent: Aug. 27, 2002

(54) VEHICULAR PNEUMATIC TIRE AND PROCESS OF MAKING VEHICULAR PNEUMATIC TIRE

(75) Inventors: Johannes-Josef Baumhöfer, Wedemark; Burkhard Wies, Hannover; Michael Jansen, Waldfeucht-Haaren, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/506,333

(22) Filed: Feb. 18, 2000

(30) Foreign Application Priority Data

Feb. 20, 1999 (EP) .............................................. 99103341

(51) Int. Cl.$^7$ ......................... B29D 30/52; B60C 11/03; B60C 111/00
(52) U.S. Cl. ............................... 152/209.8; 152/209.9; 156/110.1
(58) Field of Search .......................... 152/209.8, 209.9, 152/209.28, 903; D12/147, 517, 519, 521, 523, 527; 156/110.1

(56) References Cited

U.S. PATENT DOCUMENTS

| | | | | |
|---|---|---|---|---|
| D310,804 S | * | 9/1990 | Covert et al. | D12/147 |
| D320,965 S | * | 10/1991 | Maxwell et al. | D12/147 |
| 5,423,364 A | * | 6/1995 | Himuro | 152/209.8 |
| D369,763 S | * | 5/1996 | Saeki et al. | D12/147 |
| D376,779 S | * | 12/1996 | Kuwajima et al. | D12/147 |
| D393,613 S | * | 4/1998 | Brayer et al. | D12/147 |
| 5,964,266 A | * | 10/1999 | Boiocchi et al. | 152/903 |
| 6,213,180 B1 | * | 4/2001 | Himuro | 152/209.28 |

FOREIGN PATENT DOCUMENTS

| | | | | |
|---|---|---|---|---|
| DE | 3834383 | | 4/1990 | |
| DE | 19722572 | * | 12/1998 | 152/209.8 |
| EP | 718124 | | 6/1996 | |
| EP | 890456 | * | 1/1999 | 152/209.8 |
| JP | 63-90404 | * | 4/1988 | 152/209.8 |
| JP | 4-193607 | * | 7/1992 | 152/209.8 |

* cited by examiner

Primary Examiner—Steven D. Maki
(74) Attorney, Agent, or Firm—Greenblum & Bernstein, P.L.C.

(57) ABSTRACT

Vehicular pneumatic tire having an asymmetric tread formed in relation to a circumference of a running surface and process of making vehicular pneumatic tire. The vehicular pneumatic tire includes an outside region that includes an outside shoulder block row and an outside circumferential groove, an inside region that includes an inside shoulder block row and an inside circumferential groove, and a center region that is laterally delimited by the outside circumferential groove and the inside circumferential groove. A plurality of transverse grooves are arranged within the inside shoulder block row, and the plurality of transverse grooves further are arranged to extend into the center region. No more than about one-half of the plurality of transverse grooves are arranged to at least nearly entirely traverse the center region and are oriented to form an angle to a circumferential equator line of no more than approximately 30° over at least one-third of their longitudinal extensions. The process includes forming an outside region to include an outside shoulder block row and an outside circumferential groove, forming an inside region to include an inside shoulder block row and an inside circumferential groove, and laterally delimiting a center region with the outside circumferential groove and the inside circumferential groove. The process further includes arranging a plurality of transverse grooves within the inside shoulder block row and to extend into the center region. No more than one half of the plurality of transverse grooves are arranged to at least nearly entirely traverse the center region and are oriented to form an angle to a circumferential equator line of no more than approximately 30° over at least one-third of their longitudinal extensions.

33 Claims, 3 Drawing Sheets

VEHICULAR PNEUMATIC TIRE AND PROCESS OF MAKING VEHICULAR PNEUMATIC TIRE

CROSS-REFERENCE TO RELATED APPLICATIONS

The present application claims priority under 35 U.S.C. §119 of European Patent Application No. 99 103 341.6, filed on Feb. 20, 1999, the disclosure of which is expressly incorporated by reference herein in its entirety.

BACKGROUND OF THE INVENTION

1. Field of the Invention

The present invention relates to a vehicular pneumatic tire having a tread that is asymmetrically designed relative to a circumference of the running surface, i.e., the tread includes an outside and an inside region, which are related to the vehicle to which the tire is to be mounted, and each region has a shoulder block row. The tread also includes a center region that is laterally delimited by circumferential grooves belonging to the outside or inside region. Further, transverse grooves in the shoulder block row of the inside region are arranged to extend into the center region.

2. Discussion of Background Information

Different embodiments of tires having asymmetrical tread profiles are known from prior art. Asymmetrical tread profiles are fundamentally those that, relative to the vehicle to which the tire will be mounted, have an inside region and an outside region and the profile structures of these regions fundamentally differ from one another. Indeed, with such a profile design it is possible to deliberately influence and optimize specific tire characteristics, e.g., drainage ability, driving behavior, and tire/road noise produced during tire roll.

However, a vehicular pneumatic tire of the type generally described above is simultaneously tied to the direction of rotation and is discussed in, e.g., EP-A 0 718 124. Here, an optimized tread profile with a separate function is proposed in which, in the outside region, a driving surface portion (positive portion) is at least 75% over a width of 30 to 40% of the tread width. In the inside region, between the tread margin and the circumference center line, the driving surface portion is 55 to 65%. In the center region of the tread, a tread strip is arranged to pass through in the circumferential direction. The tread strip runs along a center circumferential line and is structured by blind grooves that run more or less in continuation of all transverse grooves from the shoulder block row of the outside region. The profile structures in the tread center region are each delimited bilaterally by one wide circumferential groove running straight in the circumferential direction. Tires having this known tread profile have good driving characteristics and good water evacuation capabilities, even at higher speeds.

From DE-A1 38 34 383, a vehicular pneumatic tire, which also has a tread profile tied to the direction of rotation, is disclosed which is not designed asymmetrically. To improve drainage ability, i.e., to improve aquaplaning behavior, and to influence or improve noise development, this tread profile is constructed such that it is essentially composed only of a multiplicity of obliquely-oriented rib profile elements running at an acute angle to the tire circumference center line. The profile channels created by these rib profile elements begin in the region of the tire circumference center line and form an angle there of 15 to 30° with the center line. In the shoulder regions, the profile channels have kinks, so that the angle of the channels to the tire circumference center line formed there is substantially larger. In the tire shoulder regions, between the already-kinked sections of the profile channels, additional profile channels running parallel thereto are provided. With such a tread profile, drainage capability can be improved, but the rib profile elements running at an acute angle to the tire circumference center line over the majority of the tread width, based on their length, are so narrow that, in tires having such a profile design, uneven wear occurs and, contrary to the assumption expressed in the document, a rather unfavorable noise production would occur.

SUMMARY OF THE INVENTION

The present invention provides an asymmetrical tread profile of the type generally described above, which improves drainage ability and favorably influences rolling noise. Moreover, the asymmetrical tread profile of the present invention provides the above advantages while considering the most even possible wear pattern of the tread.

According to the instant invention, the center region of the tread profile can have a width of approximately 25–35% of a tread width, and, e.g., every second transverse groove can be arranged to continue from a shoulder block row of an inside region into the center region as a groove that at least nearly traverses the center region. Grooves in the center region can form an angle with respect to an equator line of a maximum of approximately 30° along at least one-third of their longitudinal extension.

Therefore, tread profiles designed according to the instant invention offer the advantage that, in the center region of the tread, the drainage ability of the tread profile toward the inside region, which is known to be of primary importance, is improved by the grooves at least nearly traversing the center region. Because not all of the transverse grooves have such a continuation from the shoulder block row into the center region, the creation of excessively narrow profile positives in the center region is avoided with the specified acute-angle design of the grooves. This measure is advantageous not only for tread wear but, e.g., also for the rolling noise produced. Specifically, in the center region, abrupt impacts in the inlet and undesired oscillations in the outlet are avoided. Moreover, due to the remaining residual impulses, only frequencies with a half-tone pitch in comparison with the impulses from the shoulder are generated in the tread center region, which results in a mixed frequency that is pleasant to the human ear.

Depending on the path of the grooves in the center region of the tread, alternative embodiments of the invention can be provided in which only every third or every fourth transverse groove continues from the shoulder block row of the inside region into the center region as a groove that at least nearly traverses it the center region.

With tread profiles designed according to the invention, it is therefore possible to orient the grooves in the center region at relatively acute angles to the circumferential direction of the tire. In this regard, an embodiment may be preferable in which such grooves form an angle of less than or equal to approximately 20° to the equator line at their end regions lying by the outside region.

For the rigidity of the tread profile and, therefore, the wear pattern and driving behavior, it may be advantageous when the grooves of the center region end in a space that is a maximum of approximately 10% of the tread width, and preferably a maximum of approximately 5% of the tread width, before the circumferential groove of the outer region which delimits the center region.

Toward the circumferential groove delimiting the center region in the inside region, the angle to the circumferential direction formed by the grooves becomes larger. The angle can be selected such that it is, e.g., between approximately 30–65°, and preferably a maximum of approximately 50°. This design is advantageous for the water drainage ability of the profile.

In that regard, it is also advantageous when the remaining transverse grooves continue from the shoulder block row of the inside region in the center region or up into that region, at least in some cases, as blind grooves that are much shorter than the grooves. The blind grooves preferably end in the region of the equator line, which is also a measure to promote drainage ability.

According to an additional feature of the invention, to avoid a profile rigidity that is unfavorable for wear in the center region of the tread profile, the profile structures in the center region can be divided by additional narrow channels that have a slope in the opposite sense from the grooves and are formed to be less deep than the grooves.

The outside region is designed such that the circumferential groove arranged adjacent to the shoulder block row is constructed as a narrow groove that runs straight in the circumferential direction.

For a good response to steering forces and driving behavior, it can be also advantageous when at least one tread strip is disposed within the outside region and between the circumferential groove adjacent to the center region and the shoulder block row of the outside region.

In the inside region, a circumferential groove delimiting the center region and the shoulder block row of the inside region is preferably constructed as a groove running straight in the circumferential direction.

For tires with wide dimensions, it may be advantageous when an additional block row is located between the shoulder block row of the inside region and the center region. This arrangement allows the tread profile to be widened while retaining the desired profile characteristics.

Even wear of t he tread profile can be further promoted in that each transverse groove, after passing through a circumferential groove in a direction toward the center of the tire, continues such that a continuation of a lower edge of the transverse groove on the inside side of the circumferential groove merges from a profile structure located further outside into an upper edge of the transverse groove, the blind groove, or the groove of the adjacent profile structure that is located further inside.

The present invention is directed to a vehicular pneumatic tire having an asymmetric tread formed in relation to a circumference of a running surface. The vehicular pneumatic tire includes an outside region that includes an outside shoulder block row and an outside circumferential groove, an inside region that includes an inside shoulder block row and an inside circumferential groove, and a center region that is laterally delimited by the outside circumferential groove and the inside circumferential groove. A plurality of transverse grooves are arranged within the inside shoulder block row, and the plurality of transverse grooves further are arranged to extend into the center region. No more than one-half of the plurality of transverse grooves are arranged to at least nearly entirely traverse the center region and are oriented to form an angle to a circumferential equator line of no more than approximately 30° over at least one-third of their longitudinal extensions.

According to a feature of the instant invention, the no more than half of the plurality of transverse grooves can include every other transverse groove in the inside shoulder block row. Alternatively, the no more than half of the plurality of transverse grooves can include every third transverse groove in the inside shoulder block row. Further still, the no more than half of the plurality of transverse grooves can include every fourth transverse groove in the inside shoulder block row.

In accordance with another feature of the instant invention, the center region can include approximately 25–35% a total width of the tread.

According to still another feature of the present invention, the no more than one-half of the plurality of transverse grooves are further arranged to form an angle to the equator line of no more than approximately 20° to the equator line at their longitudinal ends located in a region of the outside region.

In accordance with a further feature of the present invention, the no more than one-half of the plurality of transverse grooves arranged to at least nearly entirely traverse the center region can be arranged to end at a position before the outside circumferential groove that is a distance of no more than approximately 10%, and preferably no more than approximately 5%, of an entire tread width from the outside circumferential groove. Further still, the no more than one-half of the plurality of transverse grooves arranged to at least nearly entirely traverse the center region can be arranged to extend through the center region and to open into the outside circumferential groove.

The no more than one-half of the plurality of transverse grooves may be oriented to form an angle to the circumferential equator line of between approximately 30–65°, and preferably no more than 50°, where these grooves open into the inside circumferential groove.

A remaining plurality of transverse grooves continue from the inside shoulder block row into the center region blind grooves which are much shorter than the plurality of transverse grooves arranged to at least nearly entirely traverse the center region. the blind grooves end in a region of the circumferential equator line, and the plurality of transverse grooves arranged to at least nearly entirely traverse the center region cross the circumferential equator line.

Further, the center region may include profile structures which are divided by additional narrow channels having a slope in an opposite sense from the transverse grooves arranged to at least nearly entirely traverse the center region. A depth of the narrow channels is less deep than a depth of the transverse grooves arranged to at least nearly entirely traverse the center region.

According to a still further feature of the present invention, the outside region can further include narrow circumferential groove positioned adjacent the outer shoulder block row arranged to run straight in the circumferential direction. The outside region may further include at least one tread strip positioned between the outside circumferential groove and the narrow circumferential groove.

Moreover, the inside circumferential groove, which is arranged to delimit the center region and the inside shoulder block row, may be a wide groove arranged to run straight in the circumferential direction. The inside region can further include an additional block row positioned between the inside shoulder block row and the center region. The plurality of transverse grooves, when extending through the inside circumferential groove, can be circumferentially offset on an opposite side of the inside circumferential groove. Further, each of the plurality of transverse grooves may be offset such that a lower edge of each transverse groove entering the inside circumferential groove continues as an upper edge of the transverse groove leaving the inside circumferential groove.

The inside region can further include an additional circumferential groove. The additional block row can delimited by the inside circumferential groove and the additional circumferential groove. The plurality of transverse grooves, when extending through the inside circumferential groove and through the additional circumferential groove, may be circumferentially offset on an opposite side of the inside circumferential groove and the additional circumferential groove, respectively. Further, each of the plurality of transverse grooves may be offset such that a lower edge of each transverse groove entering the inside circumferential groove continues as an upper edge of the transverse groove leaving the inside circumferential groove.

According to yet another feature of the invention the center region may include approximately 25–35% a total width of the tread. The no more than one-half of the plurality of transverse grooves may be further arranged to form an angle to the equator line of no more than approximately 20° to the equator line at their longitudinal ends located in a region of said outside region. The no more than one-half of the plurality of transverse grooves can be arranged to at least nearly entirely traverse said center region are arranged to end at a position before the outside circumferential groove that is a distance of no more than approximately 10% of an entire tread width from the outside circumferential groove. The no more than one-half of the plurality of transverse grooves may be oriented to form an angle to the circumferential equator line of between approximately 30–65° where these grooves open into said inside circumferential groove. Further, a remaining plurality of transverse grooves can continue from the inside shoulder block row into the center region blind grooves which are much shorter than the plurality of transverse grooves arranged to at least nearly entirely traverse the center region.

The present invention is directed to a vehicular pneumatic tire having an asymmetric tread formed in relation to a circumference of a running surface. The vehicular tire includes an outside region having an outside shoulder block row and an outside circumferential groove, an inside region having an inside shoulder block row and an inside circumferential groove, and a center region that is laterally delimited by the outside circumferential groove and the inside circumferential groove. A plurality of inside transverse grooves are open into the inside circumferential groove, and a plurality of center transverse grooves are arranged within the center region to extend from the inside circumferential groove at least nearly through the center region. The plurality of center transverse grooves are oriented to form an angle to a equator line of no more than approximately 30° over at least one-third of their longitudinal extensions. A ratio of the plurality of inside transverse grooves to the plurality of center transverse grooves is at least 2:1.

In accordance with a feature of the invention, the ratio is 3:1. Alternatively, the ratio is 4:1.

According to another feature of the invention, a remaining number of the inside transverse grooves can extend through the inside circumferential groove and into the center region as blind grooves. The blind grooves do not extend to the equator line, and the center transverse grooves cross the equator line.

Further, the inside transverse grooves can be circumferentially offset from the center transverse grooves. The inside transverse grooves may be offset from the center transverse grooves in that a lower edge of the inside transverse grooves entering the inside circumferential groove continues as an upper edge of the center transverse grooves leaving the inside circumferential groove.

The present invention is directed to a process of making a vehicular pneumatic tire having an asymmetric tread formed in relation to a circumference of a running surface. The process includes forming an outside region to include an outside shoulder block row and an outside circumferential groove, forming an inside region to include an inside shoulder block row and an inside circumferential groove, and laterally delimiting a center region with the outside circumferential groove and the inside circumferential groove. The process further includes arranging a plurality of transverse grooves within the inside shoulder block row and to extend into the center region. No more than one half of the plurality of transverse grooves are arranged to at least nearly entirely traverse the center region and are oriented to form an angle to a circumferential equator line of no more than approximately 30° over at least one-third of their longitudinal extensions.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
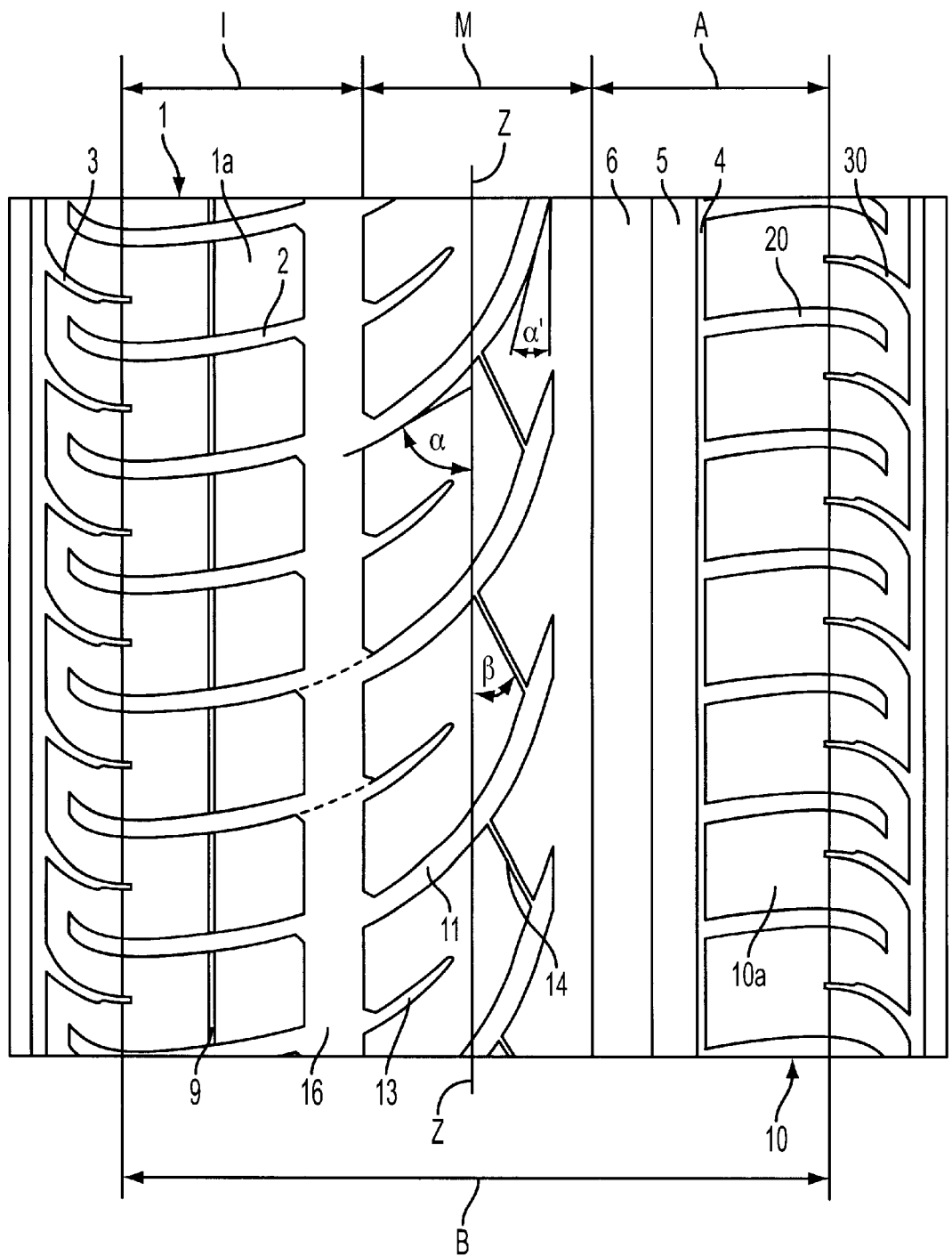
FIGS. 1, 2, and 3 illustrate exemplary embodiments of tread profiles for vehicular pneumatic tires in accordance with the present invention.
Figure 2:
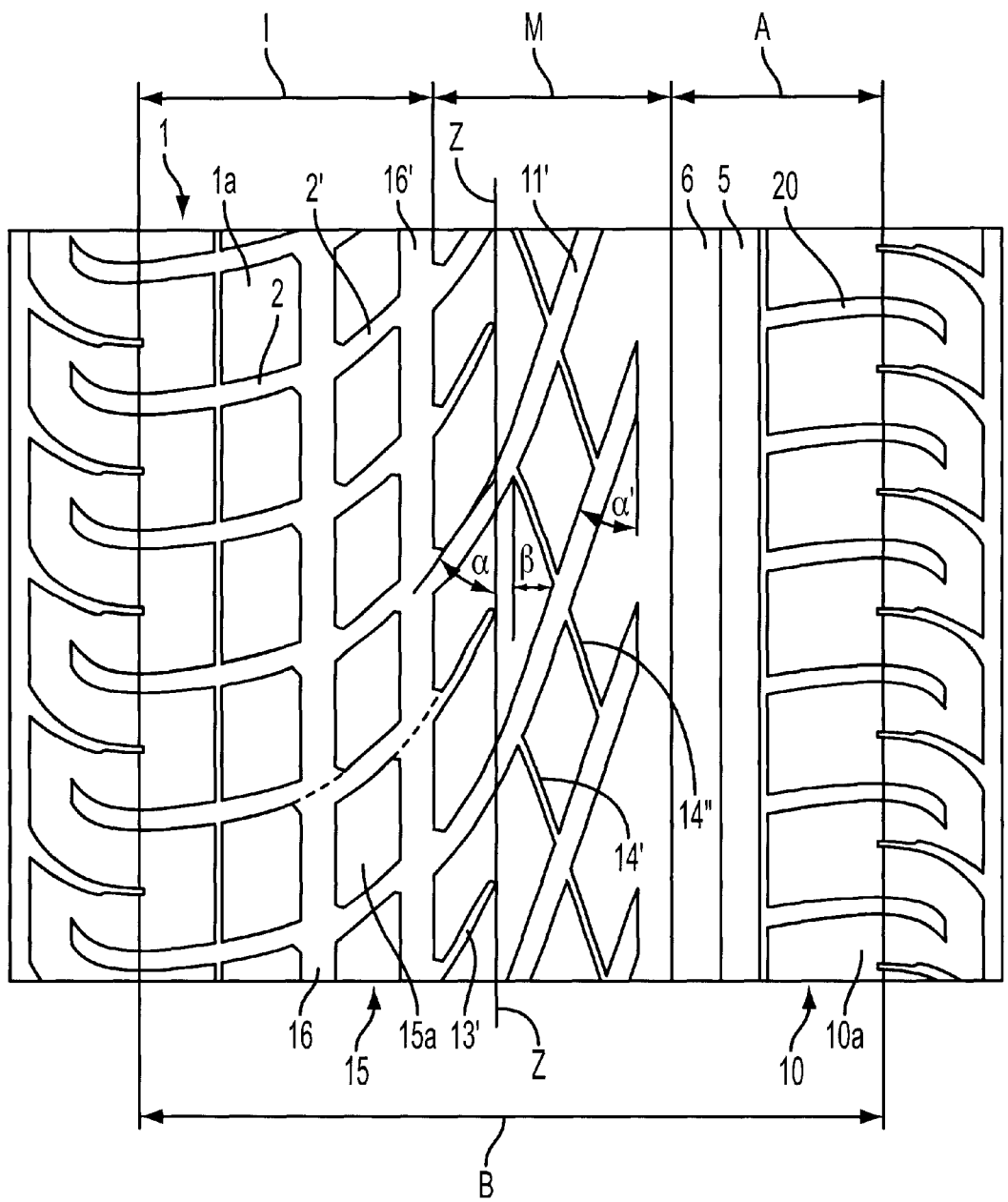
Figure 3:
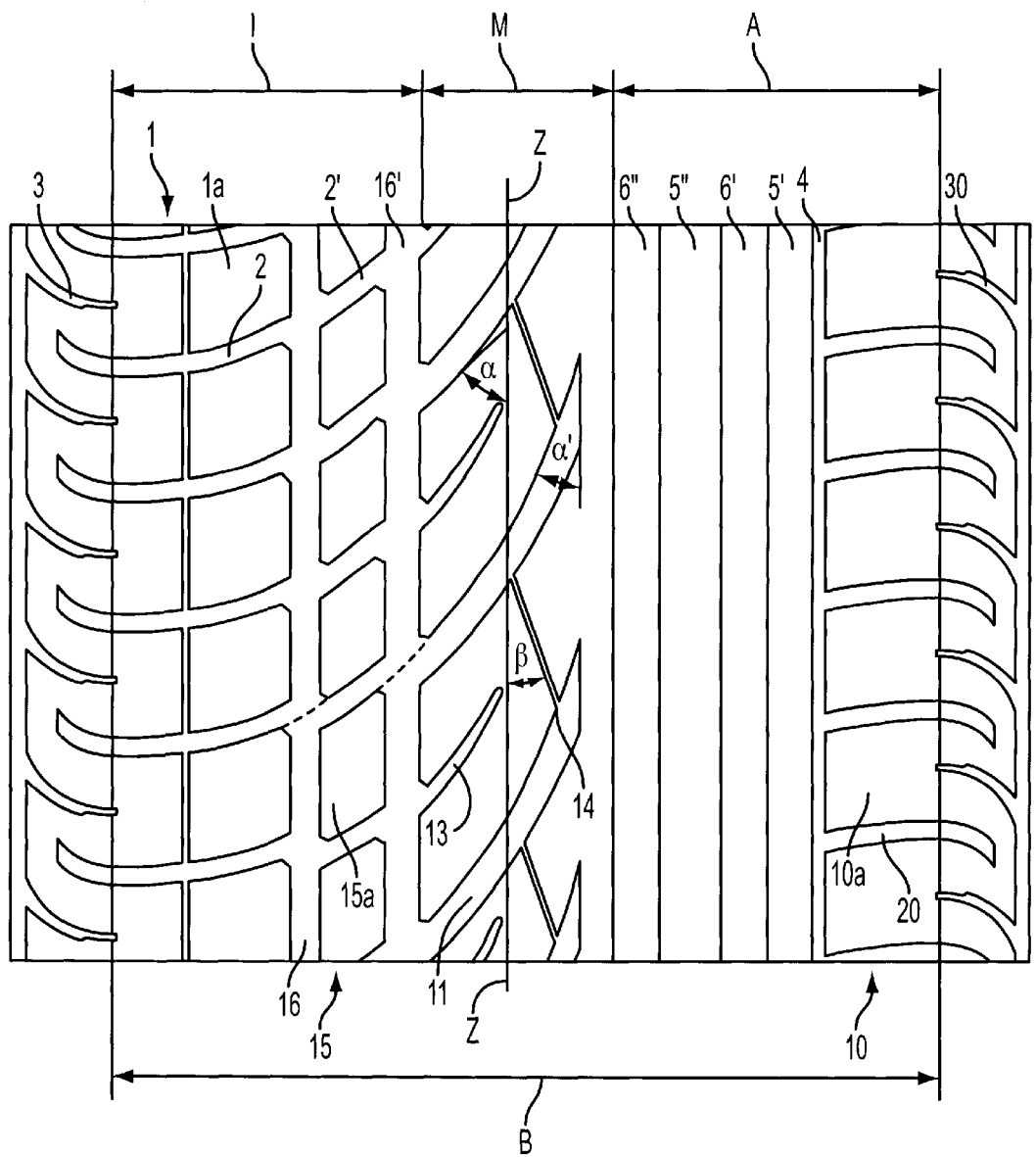

The embodiments of tread profiles illustrated in FIGS. 1–3 are intended, e.g., for automobile radial tires that can be driven at higher speeds and, in particular, are appropriate as so-called "summer tires." In this regard, the tread profiles formed according to the instant invention are profiles which are asymmetric relative to the tire equator plane but are not profiles tied to a running direction. Further, asymmetrically constructed profiles should be understood as profiled, in which each tread half oriented or adapted to face the outside of the vehicle when the tires are mounted include profile structures that fundamentally differ from profile structures arranged in the tread half oriented or adapted to face the inside of the vehicle when the tires are mounted. Moreover, in each of the exemplary embodiments, the structure of the shoulder elements of the profiles remain substantially the same.

In the following complete description, tread profiles shown in the drawings are viewed across their width B, which corresponds to a width of a region of the tread profile that, when the tire is rolling, is in contact with the ground (according to, e.g., E.T.R.T.O. standards). Because of the asymmetry, tread profiles formed in accordance with the present invention each have an inside region I, which is adapted to face the vehicle when mounted, and an outside region A, which is adapted to face away from the vehicle when mounted. In a tread center region M, which extends over an equator plane or line Z—Z, tread profiles formed according to the invention are separately shown.

In the exemplary embodiment of a tread profile in accordance with the invention illustrated in FIG. 1, shoulder block rows 1 and 10 are arranged in both shoulder regions. Shoulder block rows 1 and 10 are composed of blocks 1a and 10a, respectively, over a profile circumference. Further, transverse grooves 2 and 20 are arranged to run along a curved path, e.g., in the form of an arc, which essentially deviate only slightly from an exact transverse direction of the profile. In this regard, the arc shape of transverse grooves 2, when viewed in the circumferential direction, is reversed in comparison with that of transverse grooves 20. Grooves 3 and 30, which begin outside of a region of the tread profile adapted to make contact with the ground, just barely run or extend into the tread profile region. Grooves 3 and 30 are provided for the purpose of decoration and are constructed with only a slight depth.

Shoulder blocks 1 Oa of outer shoulder block row 10 are delimited on an inside side by a relatively narrow circumferential groove 4 that runs in the circumferential direction. Further, transverse grooves 20 are arranged to open into circumferential groove 4. Circumferential groove 4 is constructed to have a width of, e.g., between 2–3 mm and to have a depth that is less than the other profile depth, which is, e.g., approximately 8 mm. In outside region A, circumferential groove 4 is adjoined by a tread strip 5, which is not further structured or is essentially not structured, having a width of, e.g., approximately 7–12 mm and is delimited on an inside side by a wide, e.g., approximately 8–13 mm, straight-running additional circumferential groove 6.

In this embodiment, inside shoulder block row 1 is formed to be somewhat wider than outside shoulder block row 10. Otherwise, shoulder block rows 1 and 10 are constructed essentially in conformity with regard to their structure. However, in inside shoulder block row 1, an additional shallow, narrow circumferential channel is provided which runs through shoulder blocks la either approximately in their centers or in a center region, and which has an essentially decorative function. Moreover, in inside region I, an outside side of inside shoulder block row 1 is delimited by a circumferential groove 16, into which transverse grooves 2 are arranged to open into. Circumferential groove 16 is a straight-running, wide circumferential groove having a width substantially corresponding to the width of circumferential groove 6 in outside region A. Center region M of the tread profile, which will be further detailed hereinbelow, adjoins circumferential grooves 6 and 16.

In center region M of the tread profile, transverse grooves 2 continue from shoulder block rows 1 as grooves 11 or 13. Center region M exhibits a structure similar to a block row in which every second transverse channel 2 of inside shoulder block row 1 continues from the shoulder block row 1 into center region M as a transverse groove 11. Further, transverse grooves 11 are arranged to nearly completely traverse center region M, i.e., transverse grooves 11 end in a space before circumferential groove 6 that is less than approximately 10%, and preferably less than approximately 5%, of the width of tread B. Beginning in the region of circumferential groove 16, grooves 11 may have an angle of inclination α of, e.g., between approximately 30–65°, in preferably approximately 40–50°, relative to equator line Z—Z, and, as grooves 11 continue to run in a direction toward circumferential groove 6, the angle relative to equator plane Z—Z decreases to an angle α' at its end regions, e.g., between approximately 10–30°, and preferably approximately 20°. This design or this path of grooves 11 is advantageous for drainage ability and, therefore, for aquaplaning behavior of the tire. Therefore, grooves 11 are essentially formed with the width of transverse grooves 2.

As described above, additional transverse grooves 2 in inside shoulder block row 1 continue into center region M as blind grooves 13, which end shortly before or in the region of equator line Z—Z. Blind grooves 13 can be formed to narrow toward their ends. Blind grooves 13 run approximately in the center of grooves 11 that are adjacent in the circumferential direction, and the path of blind grooves 13 at least substantially coincides with the path of grooves 11.

The instant design of center region M, which allows for continuation of a number of (i.e., some) transverse grooves 2 from inside shoulder block row 1 into center region M as grooves 11, prevents the profile structures in center region M from becoming excessively narrow, as would be the case if all transverse grooves 2 continued from inside shoulder block row 1 into center region 2 as grooves 11. Therefore, the design of center region M ensures that, when the tire rolls, there are no abrupt impacts in the inlet and no undesired oscillations in the outlet. As a result of the design according to the present invention, rolling noise is generated in such a way that, due to the remaining residual impulses, only frequencies with a half tone pitch in comparison with the impulses from the shoulder are generated in the center region M, which results in a mixed frequency that is pleasant to the human ear.

In the present embodiment, center region M can have a width that is approximately 25% of the width of tread B. However, in accordance with the features of the instant invention, the width of center region M can be, e.g., between approximately 20–35% of the width of tread B.

Moreover, in center region M, it may be important for the profile structures to be neither too rigid nor too strongly mobile, as both would have unfavorable consequences for tread wear. Therefore, further division of center region M may be advantageous for increasing mobility. For this reason, additional channels 14 can be provided which run in an opposite sense from grooves 11 and, which run between adjoining grooves 11 to form an angle β of, e.g., approximately 10 to 30° relative to equator line Z—Z. Channels 14 may be relatively narrow, e.g., having a width of approximately 1–2.5 mm and, in particular, may not extend to the full profile depth, but rather to, e.g., approximately half of the profile depth. The arrangement of grooves 14 within center region M can be also selected so that they and blind grooves 13 create block regions having approximately a same mobility.

The embodiment of a tread profile according to the invention illustrated in FIG. 2 differs from that depicted in FIG. 1 essentially with regard to the design of inside region I and center region M. The differences, which will be described in greater detail hereinbelow, result, in particular, from a widening of the tread profile, i.e., for tires with larger dimensions and higher speeds. However, the tread profile according to FIG. 2 includes outside region A, outside shoulder block row 10 and outside shoulder blocks 10a, transverse grooves 20, tread strip 5, and a wide circumferential groove 6 as depicted in FIG. 1.

In inside region I of the tread profile, in addition to inside shoulder block row 1 having inside shoulder blocks 1a and groove 16, which delimits the outside side of inside shoulder blocks 1a, there is a separate block row 15 including approximately rhomboid blocks 15a delimited by an outside side of circumferential groove 16 and by an additional wide circumferential groove 16' running straight in the circumferential direction. Transverse grooves 2 are arranged to continue from inside shoulder block rows 1 to delimit the upper and lower surfaces of blocks 15a as transverse grooves 2'. Further, transverse grooves 2' are arranged to open into circumferential groove 16', which delimits the inside side of center region M. Moreover, in center region M, e.g., every second transverse groove 2' can continue as a blind groove 13' that ends in a manner analogously to that depicted in FIG. 1, e.g., in a region of or shortly before equator line Z—Z. The other transverse grooves 2' can continue into center region M as grooves 11', which end only shortly before circumferential groove 6. Further, grooves 11' can be arranged to form an angle α in the region of their opening to circumferential groove 16', e.g., between approximately 30° and 65°, and preferably approximately 35°, as well as a steeper angle α' of approximately 10°–30°, and preferably approximately 20°, at the end of the groove near circumferential groove 6. In this embodiment, center region M takes up approximately 27% of the width of tread B and, in this case, is arranged such that approximately 60% of a width of center region M runs in the tread half in which outside region A is located. Moreover, grooves 11' create elongated block-like structures in center region M, which are given the necessary mobility by additional channels 14' and 14", which are designed in a manner analogous to channels 14 depicted in FIG. 1. Therefore, every block-like structure is more or less divided in four over its extension. Further, the division is made in such a way that regions with approximately matching In the embodiment according to FIG. 3, the design of inside region I of the tread profile corresponds to that depicted in FIG. 2. Thus, in addition to shoulder block row 1 with blocks 1a and transverse grooves 2 and 2', and circumferential groove 6, block row 15 with blocks 15a and circumferential groove 16' are provided.

Center region M of the embodiment shown in FIG. 3 corresponds to that depicted in FIG. 1 with regard to its design and arrangement. Therefore, center region M includes block-like structures formed by grooves 11, blind grooves 13, and additional channels 14, which are provided for reasons of mobility of the center region.

In outside region A of the tread, a first tread strip 5' is arranged to adjoin narrow circumferential groove 4 that delimits the inside side of outside shoulder block row 10. First tread strip 5' is adjoined on its inside side by a wide circumferential groove 6', which is, in turn, adjoined toward the tread center by an additional, somewhat wider tread strip 5" followed by a second wide circumferential groove 6". These additional profile structures, i.e., second tread strip 5" and circumferential groove 6", further cause a corresponding widening of the tread for tires of appropriate dimensions in this case.

The continuation of transverse grooves 2 and/or 2' into the profile structures in center region M or into additional block row 15, respectively, can occur with a slight offset in the circumferential direction. For example, for each transverse groove 2 or 2', when "passing" through circumferential grooves 16 or 16', respectively, continues such that, in a direction from inside to outside (i.e., from left to right as shown in FIG. 3), a lower edge of transverse groove 2 or 2' has its "continuation" as an upper edge of a continuing one of transverse groove 2', blind groove 13 or 13', or groove 11 or 11'. Thus, as depicted, as transverse groove 2 or 2' extends through circumferential grooves 16 or 16', the continuation of transverse groove 2 or 2' is circumferentially offset in a direction opposite the curved direction of the transverse groove. As has been shown, this measure has beneficial effects on even wear of the tread. Moreover, this circumferential offsetting is depicted in each of the exemplary embodiments dotted lines that cross circumferential grooves 16 and 16'.

It should also be mentioned that the acutely-angled corner regions of blocks or block-like structures of the tread profile can be beveled. This measure is taken for reasons of even wear and to avoid crack formations.

With tread profiles constructed according to the present invention, unlike the illustrated embodiments, it is also possible for only every third or every fourth one of transverse grooves 2 (or 2') from inside shoulder block row 1 to continue into center region M as grooves 11. Thus, the number of grooves 11 in the center region which extend at least almost entirely through the center region can be preferably about one-half, or alternatively about one-third, or about one-fourth the number of grooves 2 in the inside shoulder block row 1. The remaining continuations of transverse grooves 2 within center region M can, at least in some cases, be formed as shorter blind grooves. Of course, other distributions can be utilized as well in accordance with the invention as long as the necessary wear characteristics for the tread are maintained.

It is also fundamentally possible in tread profiles constructed according to the invention, in center region M, to construct grooves 11 or 11' as grooves that completely pass through center region M, i.e., so that they open into circumferential groove 6 (or 6"). In this regard, it must be ensured that the rigidity of the profile in center region M does not become too slight.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A vehicular pneumatic tire having an asymmetric tread formed in relation to a circumference of a running surface, comprising:

an outside region comprising an outside shoulder block row and an outside circumferential groove;

an inside region comprising an inside shoulder block row and an inside circumferential groove;

a center region being laterally delimited by said outside circumferential groove and said inside circumferential groove;

a plurality of transverse grooves being arranged within said inside shoulder block row, said plurality of transverse grooves further being arranged to extend into and terminate in said center region;

wherein no more than about one-half of said plurality of transverse grooves are arranged to at least nearly entirely traverse said center region and are oriented to form an angle to a circumferential equator line of no more than approximately 30° over at least one-third of their longitudinal extensions.

2. The vehicular pneumatic tire in accordance with claim 1, wherein said no more than one-half of said plurality of transverse grooves comprises every other transverse groove in the inside shoulder block row.

3. The vehicular pneumatic tire in accordance with claim 1, wherein said no more than half of said plurality of transverse grooves comprises every third transverse groove in the inside shoulder block row.

4. The vehicular pneumatic tire in accordance with claim 1, wherein said no more than half of said plurality of transverse grooves comprises every fourth transverse groove in the inside shoulder block row.

5. The vehicular pneumatic tire in accordance with claim 1, wherein said center region comprises approximately 25–35% of a total width of the tread.

6. The vehicular pneumatic tire in accordance with claim 1, wherein said no more than one-half of said plurality of transverse grooves are further arranged to form an angle to the equator line of no more than approximately 20° to the equator line at their longitudinal ends located in a region of said outside region.

7. The vehicular pneumatic tire in accordance with claim 1, wherein said no more than one-half of said plurality of transverse grooves arranged to at least nearly entirely traverse said center region are arranged to end at a position before said outside circumferential groove that is a distance of no more than approximately 10% of an entire tread width from said outside circumferential groove.

8. The vehicular pneumatic tire in accordance with claim 1, wherein said no more than one-half of said plurality of transverse grooves arranged to at least nearly entirely traverse said center region are arranged to end at a position before said outside circumferential groove that is a distance of no more than approximately 5% of an entire tread width from said outside circumferential groove.

9. The vehicular pneumatic tire in accordance with claim 1, wherein said no more than one-half of said plurality of transverse grooves arranged to at least nearly entirely traverse said center region are arranged to extend through said center region and to open into said outside circumferential groove.

10. The vehicular pneumatic tire in accordance with claim 1, wherein said no more than one-half of said plurality of transverse grooves are oriented to form an angle to the circumferential equator line of between approximately 30–65° where these grooves open into said inside circumferential groove.

11. The vehicular pneumatic tire in accordance with claim 1, wherein said no more than one-half of said plurality of transverse grooves are oriented to form an angle to the circumferential equator line of no more than approximately 50° where these grooves open into said inside circumferential groove.

12. The vehicular pneumatic tire in accordance with claim 1, wherein a remaining plurality of transverse grooves continue from said inside shoulder block row into said center region as blind grooves which are much shorter than said plurality of transverse grooves arranged to at least nearly entirely traverse said center region.

13. The vehicular pneumatic tire in accordance with claim 12, wherein the blind grooves end in a region of the circumferential equator line, and said plurality of transverse grooves arranged to at least nearly entirely traverse said center region cross the circumferential equator line.

14. The vehicular pneumatic tire in accordance with claim 1, wherein said center region comprises profile structures which are divided by additional narrow channels having a slope in an opposite sense from said transverse grooves arranged to at least nearly entirely traverse said center region.

15. The vehicular pneumatic tire in accordance with claim 14, wherein a depth of said narrow channels is less deep than a depth of said transverse grooves arranged to at least nearly entirely traverse said center region.

16. The vehicular pneumatic tire in accordance with claim 1, wherein said outside region further comprises a narrow circumferential groove positioned adjacent said outer shoulder block row arranged to run straight in the circumferential direction.

17. The vehicular pneumatic tire in accordance with claim 16, wherein said outside region further comprises at least one tread strip positioned between said outside circumferential groove and said narrow circumferential groove.

18. The vehicular pneumatic tire in accordance with claim 1, wherein said inside circumferential groove, which is arranged to delimit said center region and said inside shoulder block row, is a wide groove arranged to run straight in the circumferential direction.

19. The vehicular pneumatic tire in accordance with claim 18, wherein said inside region further comprises an additional block row positioned between said inside shoulder block row and said center region.

20. The vehicular pneumatic tire in accordance with claim 19, wherein said plurality of transverse grooves, when extending through said inside circumferential groove, are circumferentially offset on an opposite side of said inside circumferential groove.

21. The vehicular pneumatic tire in accordance with claim 20, wherein each of said plurality of transverse grooves are offset such that a lower edge of each transverse groove entering said inside circumferential groove continues as an upper edge of said transverse groove leaving said inside circumferential groove.

22. The vehicular pneumatic tire in accordance with claim 19, further comprising an additional circumferential groove, wherein said additional block row is delimited by said inside circumferential groove and said additional circumferential groove.

23. The vehicular pneumatic tire in accordance with claim 22, wherein said plurality of transverse grooves, when extending through said inside circumferential groove and through said additional circumferential groove, are circumferentially offset on an opposite side of said inside circumferential groove and said additional circumferential groove, respectively.

24. The vehicular pneumatic tire in accordance with claim 23, wherein each of said plurality of transverse grooves are offset such that a lower edge of each transverse groove entering said inside circumferential groove continues as an upper edge of said transverse groove leaving said inside circumferential groove.

25. The vehicular pneumatic tire in accordance with claim 1, wherein said center region comprises approximately 25–35% of a total width of the tread, wherein said no more than one-half of said plurality of transverse grooves are further arranged to form an angle to the equator line of no more than approximately 20° to the equator line at their longitudinal ends located in a region of said outside region, wherein said no more than one-half of said plurality of transverse grooves arranged to at least nearly entirely traverse said center region are arranged to end at a position before said outside circumferential groove that is a distance of no more than approximately 10% of an entire tread width from said outside circumferential groove, wherein said no more than one-half of said plurality of transverse grooves are oriented to form an angle to the circumferential equator line of between approximately 30–65° where these grooves open into said inside circumferential groove, and wherein a remaining plurality of transverse grooves continue from said inside shoulder block row into said center region blind grooves which are much shorter than said plurality of transverse grooves arranged to at least nearly entirely traverse said center region.

26. A vehicular pneumatic tire having an asymmetric tread formed in relation to a circumference of a running surface, comprising:

an outside region comprising an outside shoulder block row and an outside circumferential groove;

an inside region comprising an inside shoulder block row and an inside circumferential groove;

a center region being laterally delimited by said outside circumferential groove and said inside circumferential groove;

a plurality of inside transverse grooves being open into said inside circumferential groove;

a plurality of center transverse grooves being arranged within said center region to extend from said inside circumferential groove at least nearly through and terminating in said center region, said plurality of center transverse grooves are oriented to form an angle to a equator line of no more than approximately 30° over at least one-third of their longitudinal extensions, wherein a ratio of said plurality of inside transverse grooves to said plurality of center transverse grooves is at least about 2:1.

27. The vehicular pneumatic tire in accordance with claim 26, wherein said ratio is 3:1.

28. The vehicular pneumatic tire in accordance with claim 26, wherein said ratio is 4:1.

29. The vehicular pneumatic tire in accordance with claim 26, wherein a remaining number of said inside transverse grooves extend through said inside circumferential groove and into said center region as blind grooves.

30. The vehicular pneumatic tire in accordance with claim 29, wherein said blind grooves do not extend to the equator line, and said center transverse grooves cross the equator line.

31. The vehicular pneumatic tire in accordance with claim 26, wherein said inside transverse grooves are circumferentially offset from said center transverse grooves.

32. The vehicular pneumatic tire in accordance with claim 31, wherein said inside transverse grooves are offset from said center transverse grooves in that a lower edge of said inside transverse grooves entering said inside circumferential groove continues as an upper edge of said center transverse grooves leaving said inside circumferential groove.

33. A process of making a vehicular pneumatic tire having an asymmetric tread formed in relation to a circumference of a running surface, the process comprising:

forming an outside region to include an outside shoulder block row and an outside circumferential groove;

forming an inside region to include an inside shoulder block row and an inside circumferential groove;

laterally delimiting a center region with the outside circumferential groove and the inside circumferential groove; and arranging a plurality of transverse grooves within the inside shoulder block row and to extend into the center region;

wherein no more than about one half of the plurality of transverse grooves are arranged to at least nearly entirely traverse and terminate in the center region and are oriented to form an angle to a circumferential equator line of no more than approximately 30° over at least one-third of their longitudinal extensions.

* * * * *